(No Model.)
E. N. WICKES.
WINDING DRUM.
No. 448,868. Patented Mar. 24, 1891.
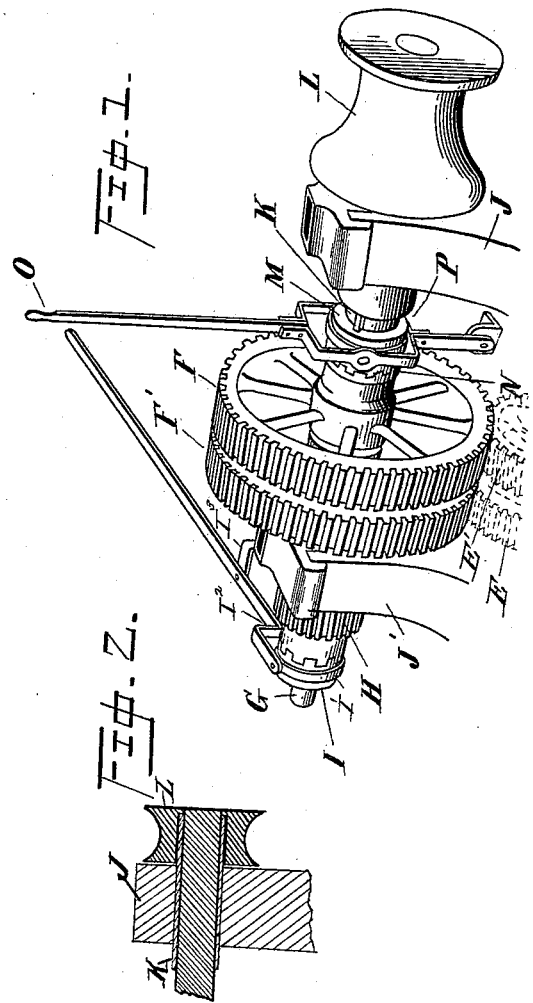
Witnesses:
P. M. Hulbert
M. B. O'Dogherty
Inventor:
Edward N. Wickes
By Thos. S. Sprague & Son
Atty.

UNITED STATES PATENT OFFICE.

EDWARD N. WICKES, OF EAST SAGINAW, MICHIGAN.

WINDING-DRUM.

SPECIFICATION forming part of Letters Patent No. 448,868, dated March 24, 1891.

Application filed June 2, 1890. Serial No. 354,022. (No model.)

*To all whom it may concern:*

Be it known that I, EDWARD N. WICKES, a citizen of the United States, residing at East Saginaw, in the county of Saginaw and State of Michigan, have invented certain new and useful Improvements in Winding-Drums, of which the following is a specification, reference being had therein to the accompanying drawings.

This invention relates to new and useful improvements in winding-drums; and the invention consists in the peculiar construction, arrangement, and combination of a hoisting-drum applied to the drive mechanism, all as more fully hereinafter described.

In the drawings, Figure 1 is a perspective view of the hoisting-drum and connecting mechanism. Fig. 2 is a sectional view showing the collar passing through one of the standards.

F is an idle and F' a rigid gear-wheel mounted upon the shaft G and driven by suitable pinions E and E', (shown in dotted lines,) said pinions being driven by any suitable power and mounted upon a shaft (not shown) journaled in the standards. On one end of the shaft G, I show a clutch I, slidingly secured on a feather, having a loose annular collar I' on its periphery, and having connected thereto, by means of a yoke, a handle I², fulcrumed at I³ upon a suitable bracket secured to the standard. This clutch is adapted to be thrown into engagement with the idle-pinion H, which is adapted to be in mesh with any suitable mechanism.

K is a sleeve upon one end of the drive-shaft, extending through the standard J, to the outer end of which there is secured the winding-drum L.

M is the collar upon the sleeve K, engaging therewith by means of a feather, and suitably notched in its inner face to engage with the notches upon the collar N upon the gear-wheel F, having a suitable hand-lever O to move the two parts in or out, the whole forming a clutch mechanism P for engaging the wheel F with and disengaging it from the winding-drum L.

The operation is as follows: The pinions E and E' being driven by any suitable power, motion will be transmitted to the shaft G through the gear-wheel F'. When it is desired to revolve the drum L, the clutch P is thrown into engagement with the collar upon the idle-gear F, mounted upon the sleeve, thus transmitting motion to the winding-drum.

What I claim as my invention is—

The combination, with two standards, of a horizontal shaft mounted therein, a sleeve on the shaft extending through one of the standards and formed with a feather thereon, a winding-drum secured on the outer end of the sleeve, a sliding clutch-collar on the sleeve, a loose and a rigid gear-wheel on the shaft, clutch projections on the loose gear with which the clutch-collar engages, a lever for moving the clutch, and means for actuating the gears, substantially as described.

In testimony whereof I affix my signature, in presence of two witnesses, this 22d day of May, 1890.

EDWARD N. WICKES.

Witnesses:
ALFRED HUDSON,
JNO. W. HOAG.